US008725886B1

(12) United States Patent
Pulier et al.

(10) Patent No.: US 8,725,886 B1
(45) Date of Patent: May 13, 2014

(54) PROVISIONED VIRTUAL COMPUTING (75) Inventors: Eric Pulier, Los Angeles, CA (US);
Clinton B. Battersby, Norwood, MA (US); Paul J. Gaffney, Southborough, MA (US)

(73) Assignee: Desktone, Inc., Lexington, MA (US)

( * ) Notice: Subject to any disclaimer, the term of this patent is extended or adjusted under 35 U.S.C. 154(b) by 746 days.

(21) Appl. No.: 11/875,297

(22) Filed: Oct. 19, 2007

Related U.S. Application Data (60) Provisional application No. 60/853,052, filed on Oct. 20, 2006.

(51) Int. Cl.
*G06F 15/16* (2006.01)
*G06F 15/173* (2006.01)

(52) U.S. Cl.
USPC ............ 709/229; 709/217; 709/223; 709/227

(58) Field of Classification Search
USPC .......................................... 709/226, 224, 229
See application file for complete search history.

(56) References Cited

U.S. PATENT DOCUMENTS

| | | | | |
|---|---|---|---|---|
| 6,067,545 A | * | 5/2000 | Wolff | 707/10 |
| 6,341,303 B1 | * | 1/2002 | Rhee et al. | 718/104 |
| 6,615,253 B1 | * | 9/2003 | Bowman-Amuah | 709/219 |
| 6,799,209 B1 | * | 9/2004 | Hayton | 709/226 |
| 7,299,033 B2 | * | 11/2007 | Kjellberg et al. | 455/414.1 |
| 2002/0129126 A1 | * | 9/2002 | Chu et al. | 709/220 |
| 2003/0006988 A1 | * | 1/2003 | Alford, Jr. et al. | 345/440 |
| 2004/0003087 A1 | * | 1/2004 | Chambliss et al. | 709/226 |
| 2004/0054786 A1 | * | 3/2004 | Kjellberg et al. | 709/228 |
| 2004/0054787 A1 | * | 3/2004 | Kjellberg et al. | 709/228 |
| 2005/0198130 A1 | * | 9/2005 | Bosloy et al. | 709/204 |
| 2005/0273568 A1 | * | 12/2005 | Blandy | 711/170 |
| 2006/0070077 A1 | * | 3/2006 | Erlandson et al. | 718/104 |
| 2006/0143617 A1 | * | 6/2006 | Knauerhase et al. | 718/104 |
| 2006/0294238 A1 | * | 12/2006 | Naik et al. | 709/226 |
| 2007/0043861 A1 | * | 2/2007 | Baron et al. | 709/224 |
| 2007/0083630 A1 | * | 4/2007 | Roth et al. | 709/223 |
| 2007/0260723 A1 | * | 11/2007 | Cohen et al. | 709/223 |
| 2008/0080552 A1 | | 4/2008 | Gates et al. | |

* cited by examiner

*Primary Examiner* — Ian N Moore
*Assistant Examiner* — Jenee Alexander (57) ABSTRACT

A policy indicative of overprovisioning and underprovisioning indicators defining rules to specify a triggering event indicating the need to reassess the provisioning of a user. Such reprovisioning occurs automatically upon occurrences of predetermined events, and may even be undetectable to the user. Since the reprovisioning can either expand or contract the resources available to a particular user, users are matched to an optimal, or "best fit" computational resource set to correspond to the demands of the particular user. Provisioning determining a class of the user, and is indicative of an expected resource load the user imposes. The provisioner continuously monitors usage imposed by the user to aggregate a user profile indicative of provisioning demands, automatically reevaluating the class based on the aggregated user profile according to predetermined events, and selectively reassigning the provisioning environment based on the reevaluation.

29 Claims, 7 Drawing Sheets

PROVISIONED VIRTUAL COMPUTING

CLAIM TO BENEFIT OF EARLIER FILED PATENT APPLICATIONS

This invention claims the benefit under 35 U.S.C. 119(e) of the filing date and disclosure contained in Provisional patent application having U.S. Ser. No. 60/853,052 filed, Oct. 20, 2006, entitled "Method and Apparatus for Network-Based, Multiple User, Virtual Personal Computers", incorporated herein by reference.

BACKGROUND

Modern enterprises expend substantial capital to maintain an IT infrastructure. In the computer realm, there is a continuing shift from initial deployment costs to ongoing maintenance costs. Traditionally, a computing infrastructure was marked with substantial up-front costs due to the high cost of computing hardware and memory resources. However, with the ongoing trend of reduced costs for computing hardware, and the converse trend of increased compensation for skilled personnel to support and maintain computer systems, a typical enterprise spends more to maintain a user then the cost to initially outfit the user. Consistent with a trend known in the industry as "Moore's law," computing power per dollar continues to double roughly every 18 months, while support costs, such as help desk staffing, software upgrades, and hardware enhancements, continue to burden the cost of provisioning a user.

This shift from acquisition to maintenance has provided a motivation for "overprovisioning" a user. The classic overprovisioned user is the high ranking, non-technical executive who requisitions a PC that is more powerful than any subordinates, yet is employed only for reading an occasional email. Nonetheless, the above stated trend brings the reality that is may be less expensive to initially overprovision a user than to later remedy an underprovisioned user. However, enterprises may not have the resources to optimally provision a user such that the user is neither overprovisioned or underprovisioned, and continue to bear the burden in the form of responding to and upgrading an underprovisioned user or absorbing the inefficiency of an overprovisioned user. For a substantially sized enterprise with many users, such as corporations, universities, and other enterprises, the aggregate cost can be substantial

SUMMARY

In a virtual computing environment as disclosed and claimed herein, a virtual environment manager assigns a user to a provisioning class (class) based on the expected resources that user will consume. Classes include a terminal server environment, for multiple users of moderate usage, a hypervisor environment providing the individual user with memory and CPU isolation from other users, and grid services, for high demand users and those who "spike" substantial demands and/or require resources well above the typical demand of most other users. The virtual desktop computing environment centralizes computing resources that would otherwise take the form of unused desktop PC resources. This virtualization allows an optimal, or "best fit" provisioning of users such that each user is neither overprovisioned or underprovisioned Configurations defined herein are based, in part, on the observation that many enterprises typically err on the side of overprovisioning a user to offset the high cost of manually reconfiguring, servicing, or outright replacing computing resources allocated to the user. Further, in a conventional PC based enterprise environment, each user has a dedicated set of resources (i.e. desktop PC) which is not reallocatable for other uses when idle or when the user logs out/powers down the system. Thus, each idle PC represents a source of wasted computing resources when the user is overprovisioned. In contrast, a user who consistently utilizes available CPU and memory on their PC is an underprovisioned user who would benefit from additional resources. Such underprovisioned users tend to generate requests for resource adjustments, in the way of help desk calls, and requisitions for increased resources and/or new equipment.

Conventional computing environments suffer from the shortcoming of being prone to overprovisioning or underprovisioning a user. Such misprovisioning is inefficient because it denotes underutilized computing resources or ineffective and/or disgruntled users. Configurations herein substantially overcome such shortcomings by defining a policy indicative of overprovisioning and underprovisioning indicators (misprovisioning flags), and defining rules to specify a triggering event indicating the need to reassess the provisioning of a user. Such reprovisioning occurs automatically upon occurrences of predetermined events, and may even be undetectable to the user. Since the reprovisioning can either expand or contract the resources available to a particular user, users are matched to an optimal, or "best fit" computational resource set to correspond to the demands of the particular user.

In a particular configuration, exemplified below, the claimed virtual computing deployment organizes desktop computing requirement in a way that allows the desktop computing requirement to be satisfied by a range of virtualization platforms, or classes of usage, and monitoring the virtualized desktop to detect service provisioning deficiencies by either adding enough virtual resources (CPU/Memory) or by moving the virtualized desktop to a higher performance virtualization platform (i.e. next class). Reprovisioning to reassess the virtualization platform is event driven to periodically reprovision the user as needed by a reprovisioning process that periodically reviews the performance and utilization data collected to detect over-provisioned virtual desktops. Once identified, excess virtual resources can be removed (CPU/Memory) or the virtualized desktop can be moved to a lower performance/cost platform.

In further detail, configurations herein disclose method of providing a computing environment to multiple users by receiving a request for a computing environment from a user, and determining a class of the user, such that the class is indicative of an expected resource load the user imposes. A provisioner assigns the user to a provisioning environment corresponding to the class, such that the provisioning environment is operable to support the expected resource load. The provisioner continuously monitors usage imposed by the user to aggregate a user profile indicative of provisioning demands, automatically reevaluates the class based on the aggregated user profile according to predetermined events, and selectively reassigning the provisioning environment based on the reevaluation.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Conventional computing environments require manual reprovisioning, which are typically in response to an explicit complaint or negative occurrence on behalf of the acting user. Even more elusive are overprovisioned users, as overprovisioning rarely generates negative feedback, however is typically indicative of underutilized computing resources. Configurations herein address detection of underprovisioning and overprovisioning in several ways. Provisioning reassessment is performed periodically, such as on logout of a user, in response to detrimental events (typically an indicator of underprovisioning), and can be explicitly requested by a user, usually based on a suspicion or observation of misalignment of resources.

The disclosed virtual computing environment differs from conventional centralized server arrangements because conventional centralized computing environments do not maintain a correlation of user activity to misprovisioning events, and do not automatically assess and reassign user provisioning as a result of a misprovisioning determination. In contrast, configurations herein compute a provisioning class based on expected usage demands, and continually monitor and reevaluate the class to assure an appropriate provisioning level for the user. Conventional arrangements require manual reconfiguration, typically through burdensome manipulation of configuration files, and reprovisioning generally only occurs after interaction with a system manager or operation staff member. Further, many operations staff personnel may be predisposed to either underprovisioning or overprovisioning, since overprovisioning generally reduces successive complaints, while underprovisioning tends to keep information services costs lower. Varying management goals and principles may drive this result.

Figure 1:
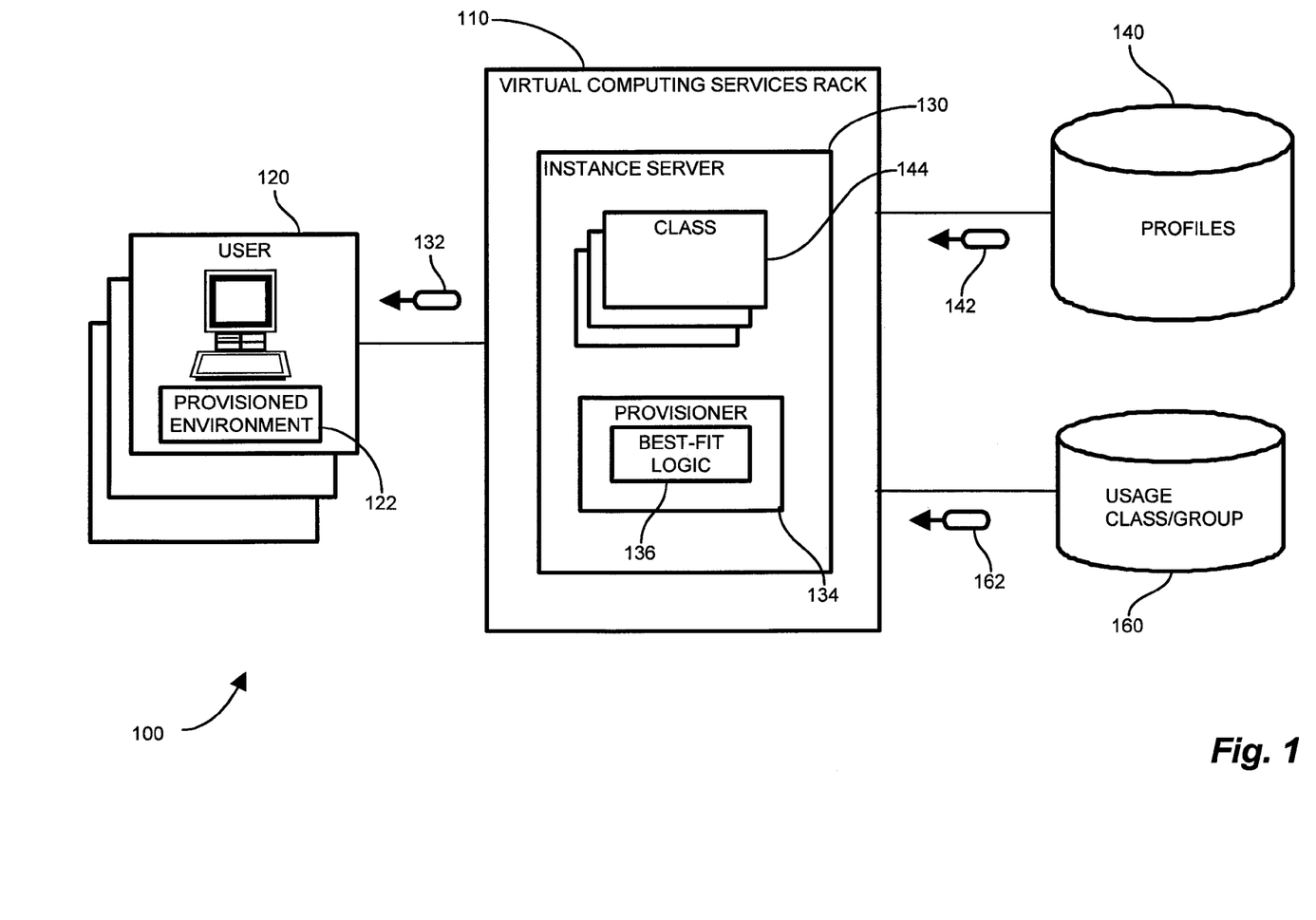
FIG. 1 is a context diagram of an exemplary computing environment employing virtual computing devices for use with the present invention.
Figure 3:
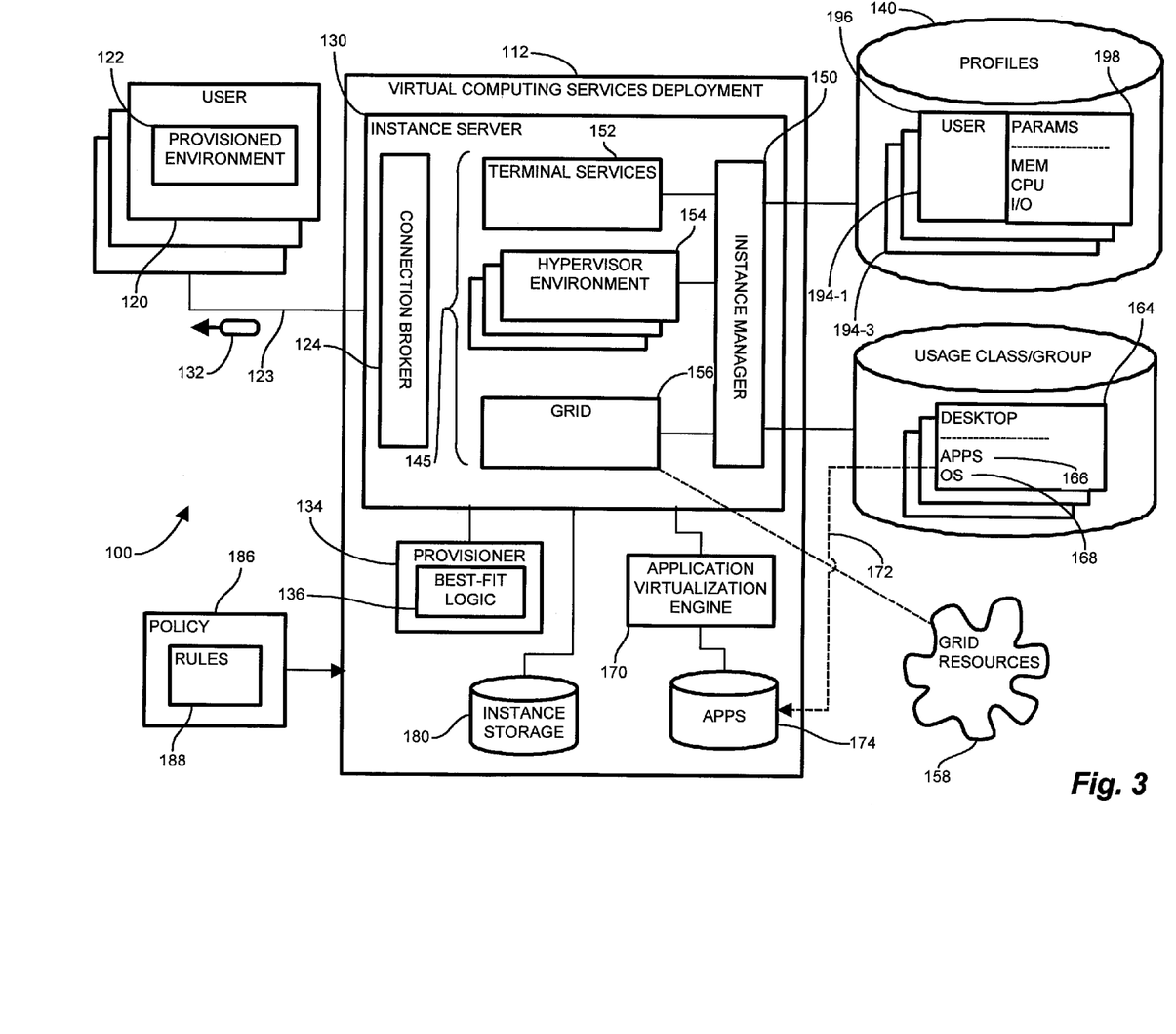
FIG. 3 is a block diagram of virtual computing provisioning in the environment of FIG. 1.
Figure 4:
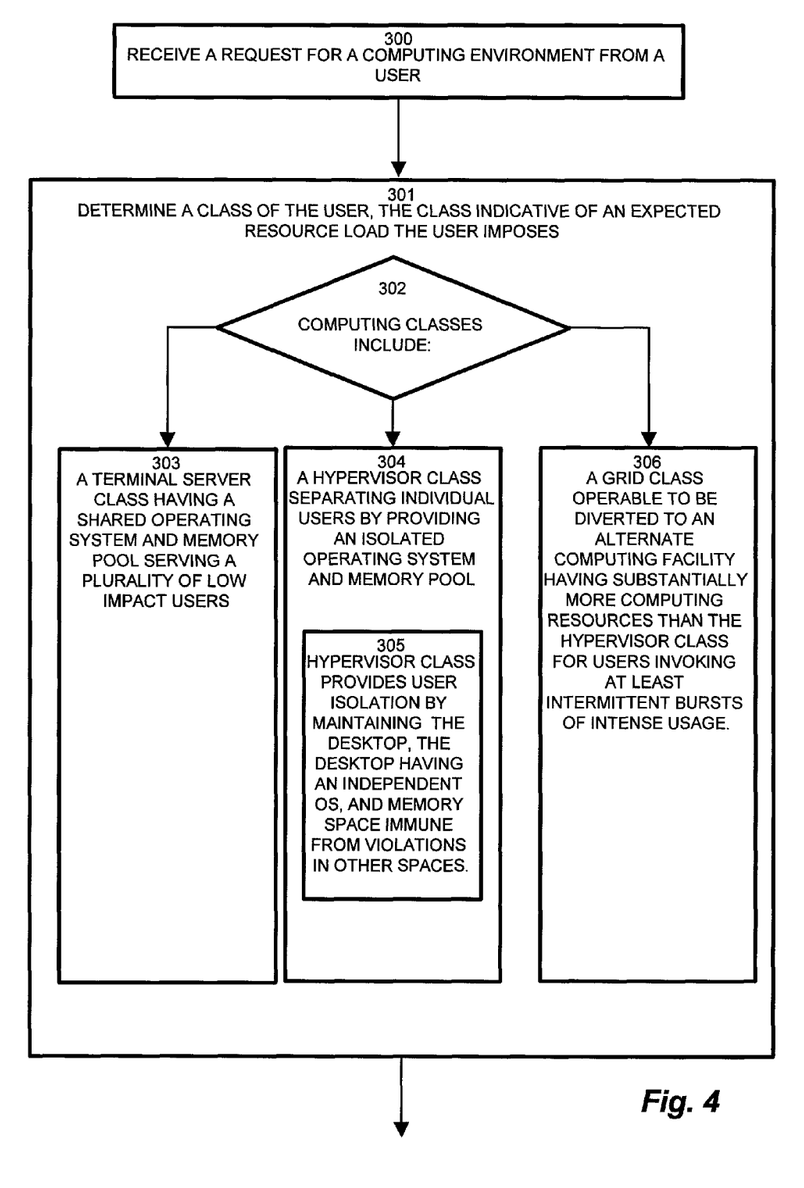
FIGS. 4-7 are a flowchart of provisioning policy implementation in the diagram of FIG. 3.
Figure 5:
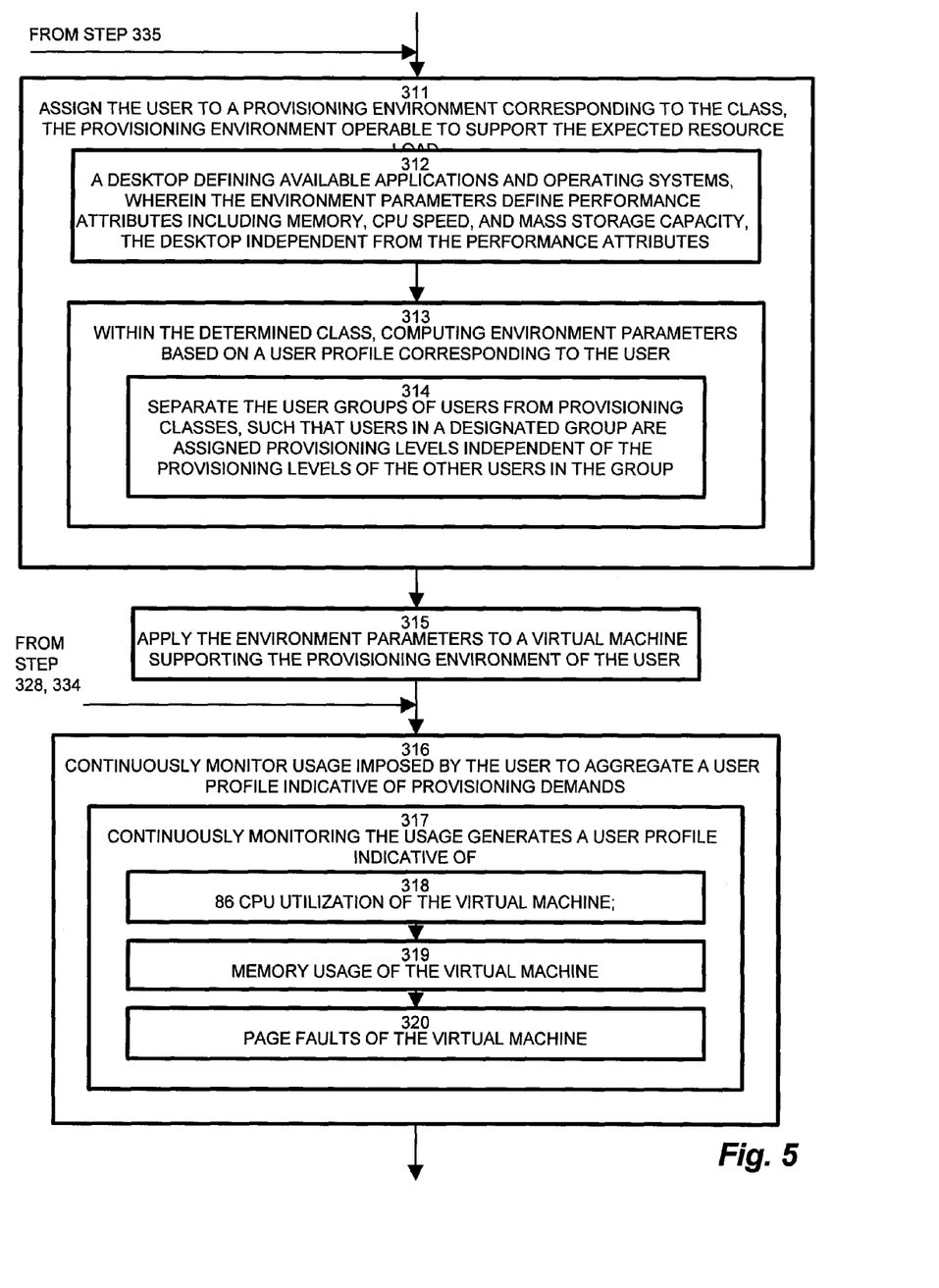
Figure 6:
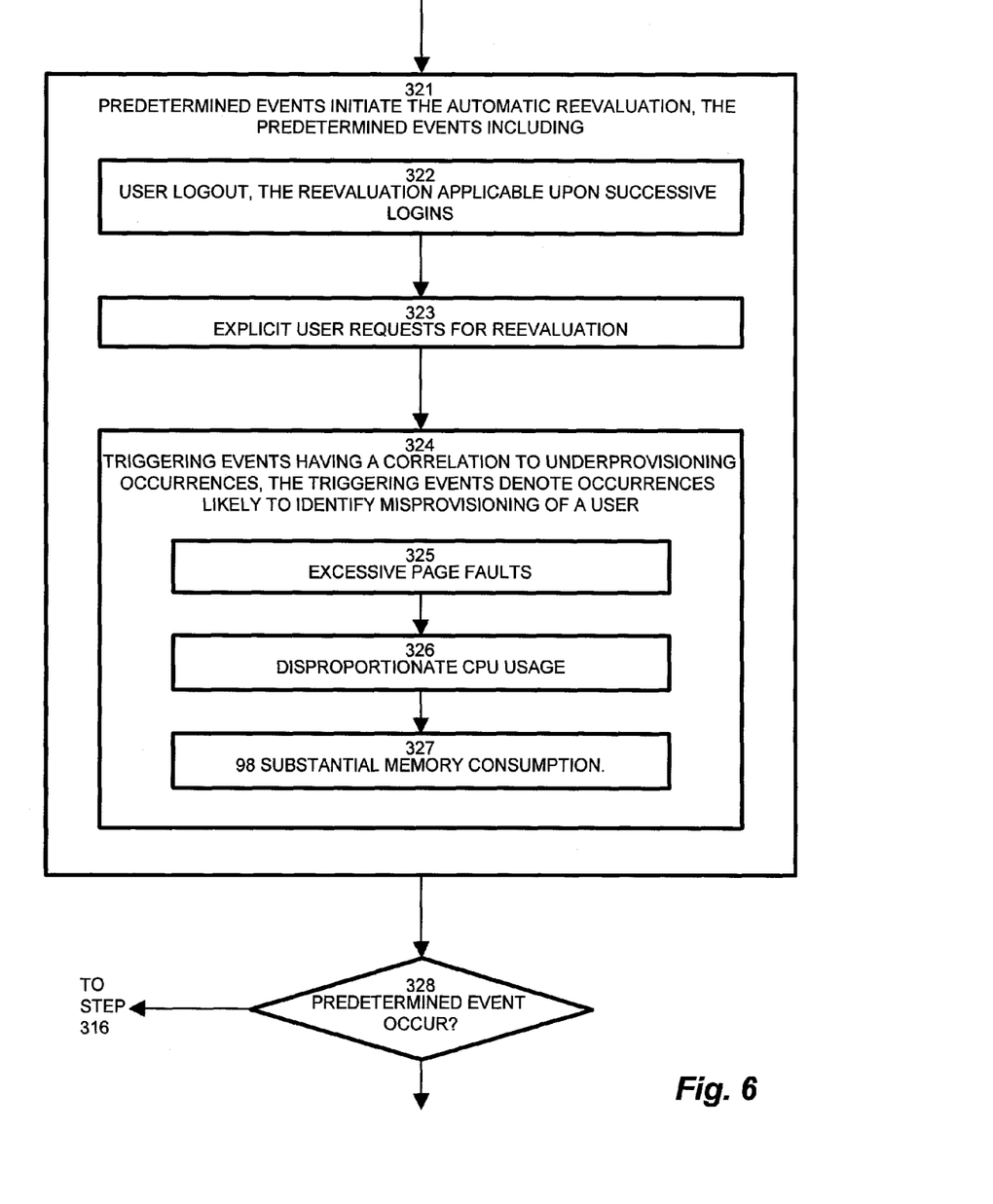
Figure 7:
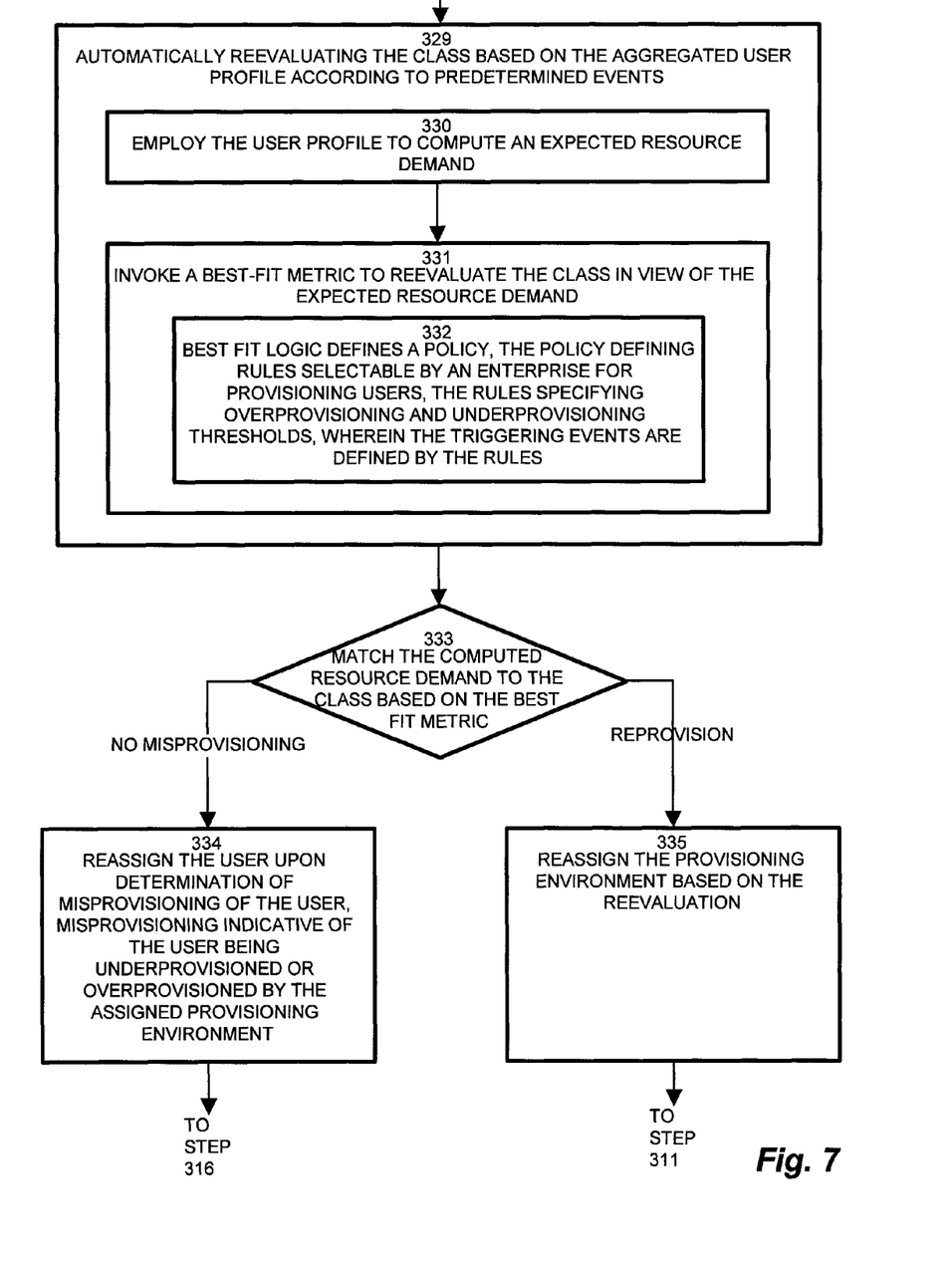

FIG. 1 is a context diagram of an exemplary computing environment employing virtual computing devices for use with the present invention. Referring to FIGS. 1 and 3, a virtual computing environment 100 includes a virtual computing services rack 110 and a plurality of user devices 120 providing computing services to a computer user, each executing a provisioned environment 122. The virtual computing services rack 110 includes an instance server 130 for providing the environment 122 via an environment instance 132 to each of the users via the user devices 120-1 . . . 120.3 (120 generally). The environment instance 132 is provided by an interface 123, which may be any suitable wired or wireless interconnection such as the Internet, 2G or 3G wireless, WiFi, LAN and WAN, to name several. The instance server 130 employs a profile 142 from a user profile database 140, and a desktop 162 from a desktop repository 160, to specify a provisioning class (discussed further below) provided by the instance server 130 via the environment instance 132. A provisioner 134 employs best-fit logic 136 to identify the class of provisioning to avoid the underprovisioning or overprovisioning of the user. The best-fit may further employ environment parameters within the class, such as memory, CPU speed, and I/O (disk) resources, to assign to the environment instance 132 for the provisioned environment 122.

The best-fit logic 136 strives to strike a balance between overprovisioning and underprovisioning, tempered by an enterprise philosophy weighing user satisfaction with cost by continuously monitoring the virtualized desktops, such that the system may, over time, identify trends that would otherwise be impossible to detect and optimize. For example, a particular user may have a very high CPU/memory requirement every Friday afternoon to build a large project. The rest of the week, they are just using the desktop for email and text editing.

In a physical desktop or statically deployed virtualized desktop, this user would be given a very powerful configuration to meet their peak computing requirements. In this configuration the user would automatically be provisioned high performance desktop environment on Fridays but given a more modest and cost effective virtualized desktop configuration to use Monday through Thursday. This optimizes both the user experience and the cost of the users virtualized desktop. Without dynamic best fit, the same user would be over provisioned in much the same fashion that they are overprovisioned in the physical world today.

Figure 2:
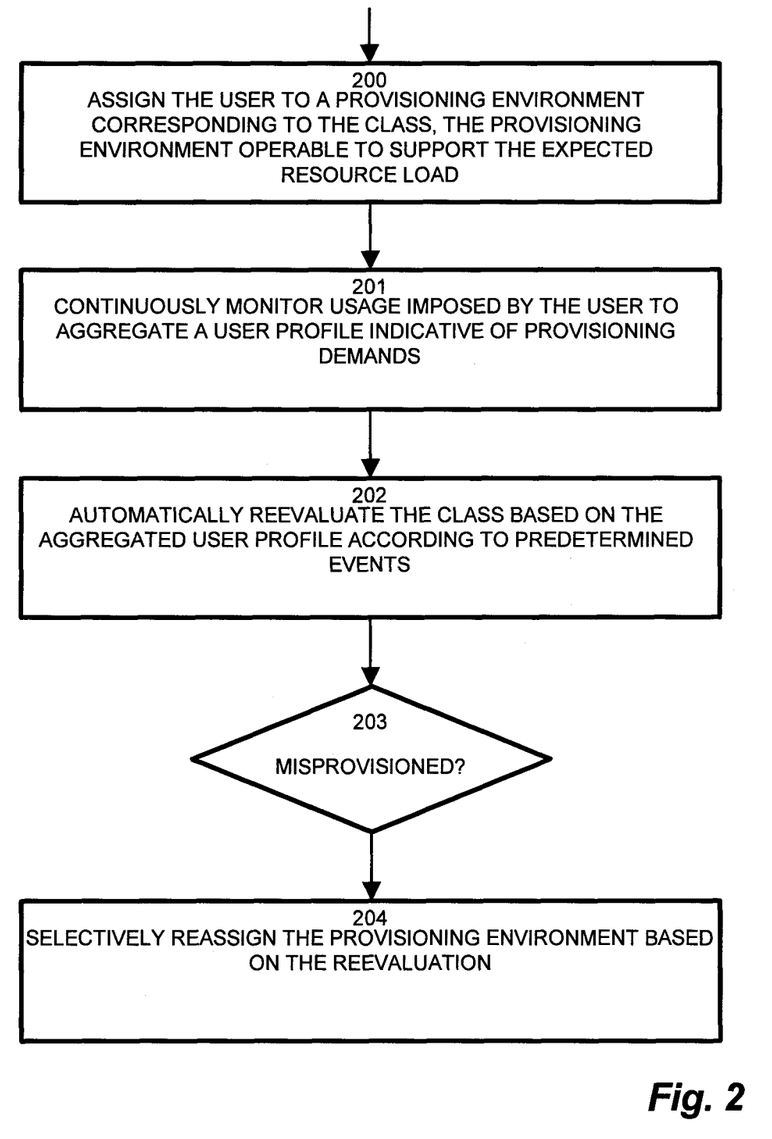
FIG. 2 is a flowchart of provisioning in the computing environment of FIG. 1.

FIG. 2 is a flowchart of provisioning in the computing environment of FIG. 1. Referring to FIGS. 1 and 2, the method of providing a computing environment 132 to multiple users 120 as defined herein includes, at step 200, assigning the user to a provisioning environment 122 corresponding to a class 144 (FIG. 3, below), such that the provisioning environment 122 is operable to support the expected resource load of the user 120. The provisioner 134 continuously monitors usage imposed by the user 120 to aggregate a user profile 142 indicative of provisioning demands, as shown at step 201, and automatically reevaluates the class 144 via best-fit logic 136 based on the aggregated user profile 142 according to predetermined events, as depicted at step 202. Such predetermined events may be either defined by regular intervals (periodic) or alerts typically associated with underprovisioning, such as page faults. A check is performed, as depicted at step 203, to determine if the best-fit logic 136 indicates a misprovisioning (under or over provisioning) of the user 120. Based on the check, the provisioner 134 selectively reassigns the provisioning environment 122 to a different class 144 based on the reevaluation.

FIG. 3 is a block diagram of virtual computing provisioning in the environment of FIG. 1. Referring to FIGS. 1 and 3, a virtual computing services deployment 112 takes the form of one or more virtual computing services racks 110, equipped and implemented as follows. The instance server 130 further includes an instance manager 150 for maintaining computing environments 152, 154 and 156 (collectively shown as 145) for each class 144. The computing environments 152, 154 and 156 support the provisioned environments 122 by defining the respective memory, CPU and I/O operations in each environment 122. The user device 120 is typically a low cost telecommunication device having sufficient capabilities to exchange keystrokes and mouse operations, as well as a display screen, but typically retains no nonvolatile storage (i.e. disk drives) and operates as a rendering device for the provisioned environment 122 for the user with respect to the computing environments 152, 154 and 156 at the instance server 130.

Upon provisioning, which occurs at initial login as well as according to predetermined intervals as defined herein, the provisioner 134 employs a user profile 142 from a profile repository 140 to assign a provisioning class (class) 144 to the user device 120, and also assigns a separate desktop 162 from a desktop repository. The class 144 indicates the level of computing resources provided to the user 120 by the instance server 130 via the environment instance 132, which in the example configuration corresponds to a terminal server 152 class, a hypervisor class 154, and a grid class 156, discussed in further detail below. A connection broker 124 establishes communication between the instance server 130 and the provisioned environment 122 via the environment instance 132.

The provisioner 134 employs the best-fit logic 136 including a history of previous computing activity in the profile database 140 by the user 120 in the profile database 140 to determine the class 144. The profile includes, for each user 120, an entry 194-1 . . . 194-3 (194 generally) having the identity 196 of the user, and environment parameters 198 applicable to the user 120, including memory allocation, cpu speed, and I/O (disk) capacity. These parameters represent the current provisioning of the level and are recomputed and/or verified by the best fit logic 136 at each provisioning evaluation to maintain the user at an appropriate provisioning level.

The instance server 130 instantiates a portion of available resources as an environment instance 132 for each provisioned environment 122 deployed on a user device 120. Each environment instance 132 is based on a particular class 144, and corresponds to a computing environment 145. In the example configuration, the classes 140 include a terminal server (TS) class 152, intended for low usage demand users, and supporting a plurality of users in a common memory with a shared operating system. A hypervisor class 154 provides OS and memory isolation for users with more specific usage demands, generally greater than the TS class 152, and preallocates a portion of available memory and CPU resources for exclusive use for a user 120. Extreme usage demands invoke the grid class 156, which delegates computing to an external computing grid 158 where computing "horsepower" is provided on a fee-for-services basis, particularly for short term intense needs.

The instance manager 150 also retrieves a desktop 162 from a class/group repository 160. The class/group repository stores desktop entries 164-1 . . . 164-3 (164 generally) for each user 120 including the application suite 166 and operating system 168 for each user. The desktop is independent from the provisioning class 144, thus allowing users from the same group (i.e. serving a particular business function such as legal, accounting, HR, etc.) to have common application arrangements without necessarily being bound to similar provisioning classes 144. Such an arrangement also avoids the need to place similar users (i.e. from the same group) in the same provisioning "bucket", for example having highly mathematical intensive applications of the accounting group served by the same terminal services instance. It should be noted that some of the environment parameters 198 and usage parameters may not be applicable to certain environments. For example, the terminal services class 152 shares an operating system across environment instances 132, hence the OS 168 of a user is irrelevant. Similarly, in a hypervisor environment 154, the best-fit logic 136 may determine that a user 120 is best provisioned on a dedicated blade in a blade server, thus rendering the CPU parameter 144 moot.

The application virtualization engine 170 operates in conjunction with the desktop 164 to provide each user with needed applications. As shown by dotted line 172, the application virtualization engine 170 retrieves applications from an application repository 174 for invocation by the computing environments 145. The application virtualization engine 170 makes desktop 166 enabled applications available, and also coordinates user/license provisions to maintain appropriate application/user invocation.

An instance storage volume 180 provides mass storage services to each of the environment instances 132, in effect acting as the local disk drive for each user device 120. The instance storage provides efficient storage, with high availability, and tight integration (emulating the appearance of local drives) by using a clustered file system combined with local RAID storage implemented and infiniband access for high throughput, as is known in the art.

Reevaluation of the class occurs in response to monitors and triggers in an ongoing, continuous manner via the gathered usage history in the repository 140.

The monitors include

CPU Utilization (as a function of time)
Memory utilization (as a function of time)
Paging activity to disk
Application load time
Direct user feedback—UI in a tool tray as well as at the end of the session invites the user to provide session feedback. System can also communicate with the user if there are known issues that may impact performance that are not related to the virtualized desktop. (Internet outages, unusually high traffic on network servers etc.) It should be noted that the instance manager 150 operating as a virtualized desktop monitor runs all the time and provides the raw data necessary to optimize the user experience while driving down costs. Other triggers may strive for optimization shot of remedying outright underprovisioning or overprovisioning. The provisioner 134 is designed to increase provisioning level very quickly but to remove resources more slowly. (thus having a bias towards providing the best possible user experience.)

Reducing resources or using lower cost virtualization is an optimization process that is always running, looking for opportunities to reduce cost.

Triggers indicative of misprovisioning include:

- High frequency of page fault indicating inadequate memory. Page faults by themselves are not enough to trigger an on-demand change of provisioning. Significant percentage of page faults over an extended period of time point to a lack of memory and would trigger a virtualization optimization.
- 100% CPU utilization for short periods of time is normal and indicates that the virtualized desktop is not limited by I/O. Extended periods of time with very high CPU indicates either an under provisioned desktop or an application has crashed and is consuming a lot of the CPU.
- Monitoring capability has visibility of which application is consuming the CPU such that the system asks the user "Is this normal or is this application not working and should be terminated." However, if the user terminates the application, it is an application stability problem, not a provisioning problem. If the user indicates that the application is working correctly albeit too slow, this will set a trigger for re-evaluating the virtual desktop provisioning.

FIGS. 4-7 are a flowchart of provisioning policy implementation in the diagram of FIG. 3. Referring to FIGS. 1 and 3-7, the method of providing a virtual, provisioned computing environment to multiple users includes receiving a request for a computing environment from a user, as depicted at step 300, and determining a class 144 of the user, such that the class 144 is indicative of an expected resource load the user imposes, as disclosed at step 301. As indicated above, usage is consistently monitored and classes periodically reevaluated, however upon a user login the user 120 generally receives a class 144 computed immediately following the previous logout. A selection is made at step 302, in which in the example configuration, the computing classes include a terminal server class having a shared operating system and memory pool serving a plurality of low impact users, as disclosed at step 303, and a hypervisor class that separates individual users by providing an isolated operating system and memory pool, ad depicted at step 304. The hypervisor class provides user isolation by maintaining the desktop 164 of the user 120 such that the desktop has an independent OS and memory space immune from violations in other environments 145.

The provisioner 134 may also direct the instance server 130 to provision the user 120 the a grid class 156 operable to be diverted to an alternate computing facility 158 having substantially more computing resources than the hypervisor class 154 (environment) for users invoking at least intermittent bursts of intense usage. It should be noted that alternate configurations may employ other classes 144 and class characteristics and properties without deviating from the scope as defined herein.

The connection broker 124 assigns the user 120 to a provisioning environment 145 corresponding to the class 144, such that the provisioning environment is operable to support the expected resource load, as shown at step 311. The provisioned environment 145 also include the desktop 164 defining available applications 166 and operating systems 168, wherein the environment parameters 198 define performance attributes including memory, CPU speed, and mass storage capacity, the desktop independent from the performance attributes, as shown at step 313. Separation between desktops 164 and environments 145 avoids forcing users 120 into misprovisioned environments, for example, simply because they are in a particular department (hence receiving a common desktop 164.

Within the determined class 144, the instance manager 150 computes environment parameters based on the user profile 194 corresponding to the user 120, as shown at step 313. Typically, enterprises organize users into groups according to function, department, or level. Accordingly, the users 120 may further define user groups, in which the user profile 194 separates the user groups of users 120 from provisioning classes 144, such that users 120 in a designated group are assigned provisioning levels independent of the provisioning levels of the other users in the group, as depicted at step 314. The instance manager applies the environment parameters 198 to the virtual machine (environment) 145 supporting the provisioning environment 122 of the user 120, as depicted at step 315.

The provisioner continuously monitors usage imposed by the user 120 to aggregate the user profile 194 indicative of provisioning demands, as shown at step 316. Ongoing monitoring allows recurring reevaluation of the provisioning of each user, allowing dynamic adjustment to the provisioning class 144 of a user. Such continuous monitoring the usage, as depicted at step 317 generates a user profile indicative of the cpu utilization of the virtual machine (environment) 145, as shown at step 318, the memory usage of the virtual machine, as depicted at step 319, and the page faults of the virtual machine, disclosed at step 320. This list of monitored parameters is exemplary; the best fit logic may incorporate other performance related criteria in reprovisioning the user 120.

During ongoing operations of the instance server 130 providing the computing environments 145 to the users 120, various predetermined events 192 triggering reevaluation occur. The predetermined events 192 occur with respect to a particular provisioned environment 122, and initiate the automatic reevaluation of provisioning, as shown at step 321, in which the predetermined events including user logout, the reevaluation applicable upon successive logins, as depicted at step 322, explicit user requests for reevaluation, as depicted at step 323, and triggering events having a correlation to underprovisioning occurrences, as shown at step 324. Reevaluation routinely occurs upon each user logout so that a reprovisioning will be effective immediately upon a successive login. Further, a user noticing an apparent slowdown, for example, may indicate so and trigger a provisioning reevaluation.

The triggering events denote occurrences likely to identify misprovisioning of a user, and include excessive page faults, as shown at step 325 disproportionate CPU usage, depicted at step 326, and substantial memory consumption, as disclosed at step 327. Other events as defined in the policy may be defined to indicate a need to perform a provisioning evaluation. Further, overprovisioned users are not likely to encounter a resource shortcoming, and therefore overprovisioning occurrences are more likely to be identified by the periodic logout evaluations.

Control reverts to step 316 until occurrence of a triggering event, as shown at step 328. The provisioner automatically reevaluates the class 144 of the user 120 based on the aggregated user profile 198 according to the predetermined events 192, as disclosed at step 328. Reevaluation the user 120 further includes employing the user profile 194 to compute an expected resource demand, as depicted at step 329, and invoking the best-fit logic 136 to reevaluate the class 144 in view of the expected resource demand, as shown at step 330. The best fit logic defines (implements) a policy 186, the policy defining rules 188 selectable by an enterprise for provisioning users, the rules specifying overprovisioning and underprovisioning thresholds, wherein the triggering events are defined by the rules, as shown at step 331. The enterprises that subscribe to the virtual computing services define policies that strike a balance between overprovisioned and more costly environments 122, and more refined underprovisioned environments, that suits the organization. Configurations herein, by maintaining a consistent usage history via the usage profile, strike a balance or appropriate provisioning through the regular provisioning assessment. The rules 188 in the policy 186 identify what the enterprise considers a properly provisioned user 120.

A check is performed, at step 322, to matching the computed resource demand to the class 144 based on the best fit 136 metric, as depicted at step 332, and reassigning the user 120 to a different class occurs upon a determination of misprovisioning of the user, misprovisioning indicative of the user being underprovisioned or overprovisioned by the assigned provisioning environment, as depicted at step 333. If no reassignment was found required by the check at step 332, Control reverts to step 316 to continue ongoing monitoring. If, in contrast, reprovisioning is needed, the provisioner 134 reassigning the provisioning environment 122 based on the reevaluation, as depicted at step 334, and control reverts to step 311 to establish a new provisioned environment 122 for the user. Reprovisioning may also involve modifying environment parameters 198 in the user profile, without changing the class 144.

Those skilled in the art should readily appreciate that the programs and methods for provisioned virtual computing as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for provisioned virtual computing has been particularly shown and described with references to embodiments thereof, it will be understood by those skilled in the art that various changes in form and details may be made therein without departing from the scope of the invention encompassed by the appended claims.

What is claimed is:

1. A method of providing a desktop computing environment to each of multiple users comprising:
    assigning each of the multiple users to a class among a plurality of classes, each class being indicative of computing resources that a user in the class is expected to consume when using the desktop computing environment;
    after receiving a request for a desktop computing environment from one of the multiple users:
        determining a class assigned to the user;
        within the determined class, computing environment parameters based on a user profile corresponding to the user;
        applying the environment parameters to a virtual machine supporting a provisioned environment for the user corresponding to the determined class for the user, the provisioned environment including processor, memory, and storage resources according to the class and an operating system and applications assigned to the user to provide the user's desktop computing environment;
        assigning the user to the provisioned environment corresponding to the class;
        monitoring and recording usage of the provisioned environment by the user including processor and memory utilization;
    for each of the multiple users, after occurrence of predetermined events:
        evaluating the recorded usage of the provisioned environment by the user to determine whether to modify the provisioned environment for the user; and
        modifying the provisioned environment for the user according to the evaluation and a best fit metric to match parameters of the provisioned environment with recorded usage by the user.

2. The method of claim 1 wherein the determined classes define a range of platforms to address computing requirements, including at least one of:
    a terminal server class having a shared operating system and memory pool serving a plurality of low impact users;
    a hypervisor class separating individual users by providing an isolated operating system and memory pool; and
    a grid class operable to be diverted to an alternate computing facility with virtually unlimited computing capabilities offered as a service.

3. The method of claim 2 wherein monitoring usage is performed in an ongoing continuous manner, such that continuously monitoring the usage generates a user profile indicative of:
    utilization of a central processing unit by the virtual machine;
    memory usage of the virtual machine; and
    page faults of the virtual machine.

4. The method of claim 3 wherein modifying the provisioned environment occurs upon a determination of misprovisioning of the user, misprovisioning indicative of the user being underprovisioned or overprovisioned by the assigned provisioning environment.

5. The method of claim 2 wherein the hypervisor class provides user isolation by maintaining a desktop, the desktop having an independent operating system, and memory space immune from violations in other environments.

6. The method of claim 2 wherein the determined platform indicates a specific selection of computing devices with which to service the user.

7. The method of claim 6, wherein the predetermined events triggering reevaluation occur with respect to a particular provisioned environment of a user and initiate the automatic reevaluation of provisioning, the reevaluation applicable upon successive logins.

8. The method of claim 1 wherein the predetermined events including:
    user logout, the reevaluation applicable upon successive logins;
    explicit user requests for reevaluation; and
    triggering events having a correlation to underprovisioning occurrences.

9. The method of claim 8 wherein the triggering events denote occurrences likely to identify misprovisioning of a user, the triggering events including at least one of:
excessive page faults indicating a lack of available memory;
disproportionate central processing unit usage; and
application load time.

10. The method of claim 1 wherein the users further define user groups, further comprising:
separating the user groups of users from provisioning classes, such that users in a designated group are assigned provisioning levels independent of the provisioning levels of the other users in the group.

11. The method of claim 1 wherein the best fit metric defines a policy, the policy defining rules selectable by an enterprise for provisioning users, the rules specifying over-provisioning and underprovisioning thresholds, wherein the triggering events are defined by the rules.

12. The method of claim 1 further comprising:
monitoring the provisioning environment to detect service provisioning deficiencies;
remedying the detected deficiencies by at least one of:
increasing environment parameters defining available computing resources; or
reassigning the provisioning environment to a different class having increased computing resources;
reviewing performance and utilization data in the aggregate user profile to detect over-provisioned virtual desktops; and
removing excessive computing resources by at least one of:
decreasing computing environment parameters; or
reassigning the provisioning environment to a different class having decreased computing resources.

13. The method of claim 1 wherein assigning the provisioning environment further includes:
determining, based on the user profile, environmental parameters indicative of the provisioned environment, the environmental parameters including operating system independence, memory space independence, and processor specification.

14. The method of claim 1 wherein evaluating the environmental parameters further comprises:
receiving an indication of a triggering event indicative of a need to reevaluate a particular user;
comparing a user profile indicative of provisioning demands of the user to a current set of environmental parameters defining the users resource availability, and based on the comparing:
changing the class of the user; or
modifying the environment parameters independently of the environmental parameters of other users.

15. The method of claim 1 wherein determining the class further comprises determining if a requester requires a dedicated operating system and processor:
assigning, if a dedicated operating system is called for, the user to a hypervisor class providing a dedicated operating system specific to processes of the user; and
assigning the user to a grid class if a dedicated processor is called for.

16. The method of claim 1 wherein reassigning is based on a user profile including a history of previous events, and reevaluating includes analyzing events independently of computing activity of other users.

17. The method of claim 1 wherein monitoring usage further includes gathering a history of previous events by determining processor utilization, memory usage, and page faults.

18. The method of claim 17 wherein matching to the class further includes defining separation of memory space, operating system and processor.

19. The method of claim 1 wherein the classes define separation of memory space, operating systems and processor, a hypervisor class providing separate memory space and operating systems, and a grid class providing a separate processor, memory space and operating system.

20. A computer system for supporting provisioning of a desktop computing environment to each of multiple users comprising:
an interface to a rendering device for receiving a request for a desktop computing environment from a user from among the multiple users;
a provisioner for determining a class of the user, from among a plurality of classes, each class being indicative of computing resources that a user in the class is expected to consume when using the desktop computing environment;
a user profile, the provisioner further operable to employ the user profile to:
within the determined class, compute environment parameters based on a user profile corresponding to the user; and
apply the environment parameters to a virtual machine so as to provision the requested desktop computing environment for the user corresponding to the determined class for the user, the provisioned desktop computing environment including processor, memory and storage resources sufficient to provide the computing resources that the user is expected to consume according to the class and an operating system and applications assigned to the user;
a connection broker for assigning the user to the provisioned desktop computing environment corresponding to the class,
the provisioner further monitoring and recording usage of the provisioned desktop computing environment by the user including processor and memory utilization;
best fit logic in the provisioner for evaluating the recorded usage of the provisioned desktop computing environment by the user after occurrence of predetermined events, using a best fit metric to match parameters of the provisioned desktop computing environment with recorded usage by the user;
an instance manager for modifying the provisioned desktop computing environment for the user based on the evaluation.

21. The computer system of claim 20 wherein the provisioner is further operable employ the user profile to:
monitor the usage to continue to aggregate the user profile indicative of:
utilization of a central processing unit by the virtual machine;
memory usage of the virtual machine; and
page faults of the virtual machine.

22. The computer system of claim 21 wherein the determined classes define a range of platforms to address computing requirements, including at least one of:
a terminal server class having a shared operating system and memory pool serving a plurality of low impact users;
a hypervisor class separating individual users by providing an isolated operating system and memory pool, the hypervisor class providing user isolation by maintaining the desktop, the desktop having an independent operating system, and memory space immune from violations in other environments; and a grid class operable to be diverted to an alternate computing facility having substantially more computing resources than the hypervisor class for users invoking at least intermittent bursts of intense usage.

23. The computer system of claim 22 wherein reassigning the user occurs upon a determination of misprovisioning of the user, misprovisioning indicative of the user being underprovisioned or overprovisioned by the assigned provisioning environment.

24. The computer system of claim 20 wherein the provisioner is responsive to predetermined events to initiate the automatic reevaluation, the predetermined events including:
    user logout, the reevaluation applicable upon successive logins;
    explicit user requests for reevaluation; and
    triggering events having a correlation to underprovisioning occurrences.

25. The computer system of claim 24 wherein the triggering events denote occurrences likely to identify misprovisioning of a user, the triggering events including:
    excessive page faults;
    disproportionate central processing unit usage; and
    substantial memory consumption.

26. The computer system of claim 25 wherein the best fit logic defines a policy, the policy defining rules selectable by an enterprise for provisioning users, the rules specifying overprovisioning and underprovisioning thresholds, wherein the triggering events are defined by the rules.

27. A computer program product having a computer readable storage operable to store a set of encoded instructions which, when executed by a processor responsive to the instructions, cause a computer connected to the computer readable storage to perform method of providing an automatically reprovisioned desktop computing environment to each of multiple users comprising:
    computer program code for receiving a request for a desktop computing environment from a user among the multiple users;
    computer program code for determining a class of the user, from among a plurality of classes, each class being indicative of computing resources that a user in the class is expected to consume when using the desktop computing environment;
    computer program code for computing, within the determined class, environment parameters based on a user profile corresponding to the user;
    computer program code for applying the environment parameters to a virtual machine so as to provision the requested desktop computing environment for the user corresponding to the determined class for the user, the provisioned desktop computing environment including processor, memory and storage resources sufficient to provide the computing resources that the user is expected to consume according to the class and an operating system and applications assigned to the user;
    computer program code for assigning the user to the provisioned desktop computing environment corresponding to the class;
    computer program code for, within the determined class, continuously monitoring and recording usage of the provisioned desktop computing environment by the user, including processor and memory utilization;
    computer program code for evaluating the recorded usage of the provisioned desktop computing environment by the user after occurrence of predetermined events, including
    invoking a best-fit metric to match parameters of the provisioned desktop computing environment with recorded usage by the user; and
    modifying the provisioned desktop computing environment for the user based on the evaluation.

28. A method of organizing desktop computing for virtual provisioning of desktop computing environments to each of multiple users comprising:
    designating a desktop computing environment for a user by assigning a provisioning environment from a range of available computing environments, designating further comprising:
        computing environment parameters based on a user profile corresponding to the user; and
        applying the environment parameters to a virtual machine so as to provision the desktop computing environment of the user, the provisioned desktop computing environment comprising processor, memory and storage resources and an operating system and applications assigned to the user sufficient to provide the computing resources that the user is expected to consume according to the class;
    monitoring and recording usage of the provisioned desktop computing environment including processor and memory utilization,
    periodically reviewing the recorded usage of the provisioned desktop computing environment to detect service provisioning deficiencies using a best fit metric that matches parameters of the provisioned desktop computing environment with the recorded usage by the user, service provisioning deficiencies indicative of at least one of overprovisioning or underprovisioning a user, each provisioned desktop computing environment having an assigned class indicative of an allocation of computing resources and environment parameters indicative of available computing resources;
    remedying a detected underprovisioning by at least one of:
        increasing environment parameters defining available computing resources; or
        reassigning the user to a different class having increased computing resources;
    remedying a detected overprovisioning by at least one of:
        removing excessive computing resources by reducing environment parameters; or
        reassigning the user to a different class having decreased computing resources.

29. The method of claim 28 further comprising:
    detecting misprovisioning via monitors and triggers, monitors indicative of a usage over time and triggers indicative of a misprovisioning event, further comprising:
    monitoring resources to identify a usage threshold indicative of overprovisioning, the monitored resources including at least one of central processing unit utilization, memory utilization, and paging activity; and
    intercepting triggers include user feedback, application termination, and help desk calls.

* * * * *